United States Patent [19]

Nilssen

[11] Patent Number: 5,004,947
[45] Date of Patent: Apr. 2, 1991

[54] FLUORESCENT LAMP BALLAST WITH HIGH POWER FACTOR

[76] Inventor: Ole K. Nilssen, Caesar Dr., Barrington, Ill. 60010

[21] Appl. No.: 430,900

[22] Filed: Oct. 31, 1989

Related U.S. Application Data

[63] Continuation of Ser. No. 820,120, Jan. 21, 1986, abandoned.

[51] Int. Cl.[5] .......................................... H05B 41/14
[52] U.S. Cl. ..................... 315/224; 315/244; 315/247
[58] Field of Search .......... 315/224, DIG. 5, DIG. 7, 315/244, 247; 307/105; 333/175, 176, 181; 363/34, 47, 48, 55, 133

[56] References Cited

U.S. PATENT DOCUMENTS

| | | | |
|---|---|---|---|
| 3,859,542 | 1/1975 | Kennedy | 333/175 X |
| 3,906,337 | 9/1975 | Depenbrock | 363/48 X |
| 4,277,726 | 7/1981 | Burke | 315/98 |
| 4,587,461 | 5/1986 | Hanlet | 315/224 |
| 4,609,850 | 9/1986 | Hanlet | 315/224 X |

Primary Examiner—David Mis

[57] ABSTRACT

In a power-line-operated electronic inverter-type ballast for a fluorescent lamp, a series-connected L-C circuit is connected directly across the otherwise unfiltered output of a full-wave rectifier that provides DC voltage to the inverter. This L-C circuit is tuned to series-resonance at 120 Hz, thereby effectively shorting-out the fundamental component of the 120 Hz ripple that otherwise would be present on the DC voltage. The result is a fairly well-filtered DC voltage obtained without the use of the conventional and often short-lived electrolytic capacitor. This particular method of reducing the amplitude of the ripple voltage results in a particularly high power factor in respect to the power drawn by the ballast from the power line.

12 Claims, 1 Drawing Sheet

FLUORESCENT LAMP BALLAST WITH HIGH POWER FACTOR

RELATED APPLICATION

This application is a continuation of application Ser. No. 820,120, filed Jan. 21, 1986, now abandoned.

BACKGROUND OF THE INVENTION

FIELD OF INVENTION

The present invention relates to power-line-operated electronic inverter-type ballasts for gas discharge lamps and particularly to means for providing filtered DC for the inverter therein without requiring the use of electrolytic capacitors while at the same time providing for high power factor in respect to the power drawn by the ballast from the power line.

DESCRIPTION OF PRIOR ART

A conventional electronic ballast for fluorescent lamps comprises an inverter operable to provide a relatively high frequency voltage of substantially constant RMS magnitude. The magnitude of this high frequency voltage should be kept substantially constant in order to achieve substantially constant-magnitude current for the lamps, thereby to attain maximum lamp efficacy.

In a conventional electronic ballast, a constant-magnitude high frequency output voltage is obtained by way of feeding the inverter with a substantially constant-magnitude DC voltage; and this constant-magnitude DC voltage is generally obtained by rectification of the 120 Volt/60 Hz power line voltage in combination with using an electrolytic capacitor means for smoothing out the relatively large-amplitude 120 Hz ripple voltage that otherwise would exist.

However, due to the high temperatures often encountered in applications of electronic ballasts, the use therein of an electrolytic capacitor constitutes an element of potentially significant limitation on the ballast's durability.

Moreover, the power factor resulting when using an electrolytic capacitor in this manner is unacceptably poor for may important applications.

SUMMARY OF THE INVENTION

Objects of the Invention

A first object of the present invention is that of providing a high-efficiency power-line-operated fluorescent lamp ballast that draws power from the power line with a good power factor.

A second object is that of providing in a power-line-operated inverter-type ballast having a more rugged and durable means for filtering the DC voltage used for the inverter therein.

These as well as other important objects and advantages of the present invention will become apparent from the following description.

BRIEF DESCRIPTION

In its preferred embodiment, subject invention represents a power-line-operated inverter-type ballast for a fluorescent lamp that comprises means for obtaining a relatively constant-magnitude DC voltage from rectification of 120 Volt/60 Hz line voltage without having to use an electrolytic capacitor. Instead, a series-connected L-C circuit is connected across the output of a full-wave rectifier; which L-C circuit is tuned to series-resonate at 120 Hz. The effect of this 120 Hz series-resonant circuit is that of shorting out the fundamental component of the 120 Hz ripple voltage; which then substantially reduces the net amplitude of the ripple voltage, thereby resulting in a DC voltage of fairly constant magnitude.

An important benefit resulting from this particular method of reducing the magnitude of the ripple voltage is that of achieving an excellent power factor in respect to the power drawn from the power line by the rectifier.

DESCRIPTION OF THE PREFERRED EMBODIMENT

Details of Construction

Figure 1:
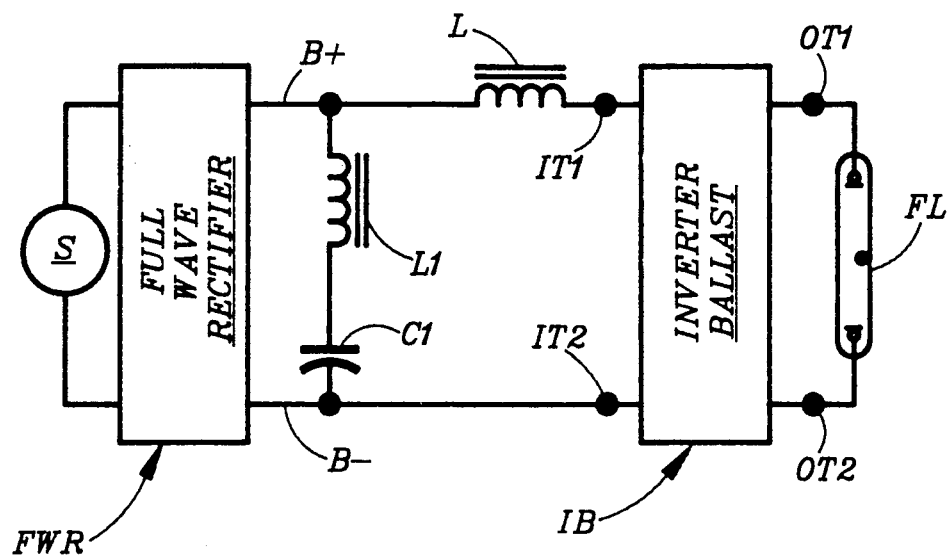
FIG. 1 schematically illustrates the preferred embodiment of the invention.

FIG. 1 shows an AC voltage source S, which in reality is an ordinary 120 Volt/60 Hz electric utility power line.

Connected to S is a full-wave rectifier FWR that rectifies the AC voltage from S to provide a DC voltage between terminals B+ and B−.

Connected directly between the B+ and B− terminals is a series-combination of an inductor L1 and a capacitor C1. An inductor L is connected between the B+ terminal and input terminal IT1 of an inverter ballast IB.

The B− terminal is connected directly to an input terminal IT2 of ballast IB.

Inverter ballast IB has output terminals OT1 and OT2, across which is connected a fluorescent lamp FL.

Figure 2:
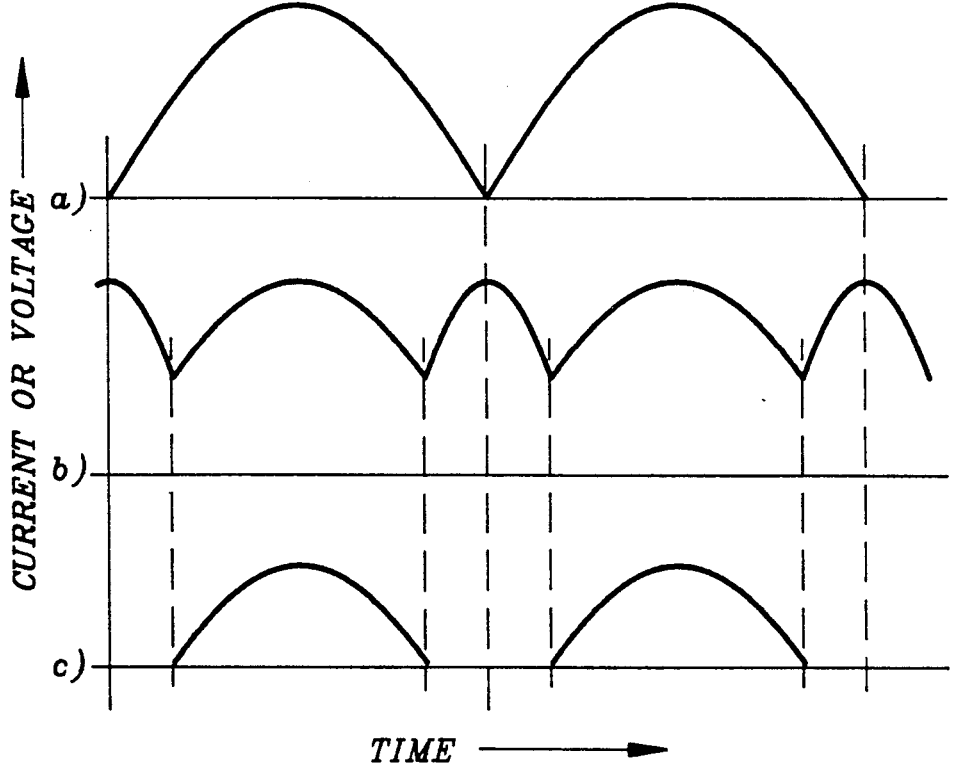
FIG. 2 shows voltage waveforms associated with the preferred embodiment of the invention.

FIG. 2 illustrates various waveforms associated with the circuit arrangement of FIG. 1.

FIG. 2a shows the voltage between the B+ and the B− terminals when nothing but a resistive load is connected thereacross. Thus, the waveform of FIG. 2a is simply that of an unfiltered full-wave rectified 120 Volt/60 Hz power line voltage; which waveform comprises a substantial amount of ripple voltage at a basic frequency of 120 Hz.

FIG. 2b shows the voltage between the B+ and the B− terminals when a resistive load is connected thereacross, but after removal of the fundamental harmonic component of the 120 Hz ripple voltage.

FIG. 2c shows the waveform of the current drawn from the power line S by the full-wave rectifier FWR under the conditions identified in connection with FIG. 2b.

DETAILS OF OPERATION

The detailed operation of the arrangement of FIG. 1 may be explained as follows.

The principal concept embodied by FIG. 1 is that of providing an effective short-circuit between the B+ and the B− terminals as far as sinusoidal currents of 120 Hz frequency is concerned. This 120 Hz short-circuit is accomplished by the series-combination of inductor L1 and capacitor C1; which series-combination is tuned to series-resonance at 120 Hz.

The sought-after effect—namely the smoothing of the unfiltered DC voltage illustrated by FIG. 2a—is obtained by simply using the single 120 Hz series-resonant circuit of L1 and C1. The voltage illustrated by FIG. 2b is a result of using the L1-C1 series-combination for smoothing or filtering purposes.

The purpose of inductor L is that of providing a degree of decoupling between the inverter load and the DC power supply. In many situations, this decoupling is not required, while in other situations it is useful for minimizing spurious resonances that may occur if the input to the inverter comprises a capacitive component of such magnitude as to cause parallel resonance with the L1-C1 series circuit at some higher harmonic of the 120 Hz ripple voltage.

Thus, the circuit arrangement of FIG. 1 operates such as to provide a short circuit between the B+ and the B— terminals for currents of frequency twice that of the power line voltage; which therefore provides for a DC voltage of waveshape like that illustrated by FIG. 2b.

It is noted that the DC magnitude (i.e., the average magnitude) of the waveform depicted in FIG. 2b is higher by a factor of about 1.35 as compared with that of the waveform of FIG. 2a. Moreover, the peak-to-peak ripple voltage of the FIG. 2b waveform is only about ± 30% of the DC magnitude, as compared with more than about ± 80% for the waveform of FIG. 2a.

The power factor associated with the voltage waveform of FIG. 2b, which results in the current waveform of FIG. 2c, is approximately 90%.

With the degree of ripple voltage associated with the waveform of FIG. 2b, the RMS voltage/current provided to the fluorescent lamp can readily be kept adequately constant to provide for highly efficient lamp operation—with the fluorescent lamp being kept substantially ionized on a continuous basis. With the waveform of FIG. 2a, on the other hand, the lamp would substantially de-ionize for each dip-to-zero of the DC voltage; and the resulting lamp efficiency would be seriously impaired.

Capacitor C1 can conveniently be a film-type capacitor, having to store only a small fraction of the energy that would have to be stored by an electrolytic capacitor to achieve the same degree of filtering of the DC voltage. In fact, in a particular situation wherein the total load represented by the inverter amounted to about 100 Watt, capacitor C1 had a value of 6.8 micro-Farad at 400 Volt; which compares with a value of 100 micro-Farad at 200 Volt for an electrolytic capacitor that would have provided a substantially equivalent degree of filtering. The matching L1 had an inductance of about 0.26 Henry.

The output of inverter ballast IB is a current-limited high-frequency (30 kHz) voltage suitable for operating the fluorescent lamp FL. Once ignited, the lamp draws current of magnitude substantially proportional to that of the DC voltage provided between the input terminals (IT1 and IT2). (Thus, if this DC voltage were to be like that of FIG. 2a, the lamp would have to be re-ignited for each half-cycle of the 60 Hz power line vltage.)

It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

What is claimed is:

1. A ballast means adapted to be powered from the AC voltage on an ordinary electric utility power line and operative to power a gas discharge lamp, comprising:

rectifier means operative to connect with the power line and to provide a unidirectional current at a pair of DC terminals; a DC voltage being present across the DC terminals;

L-C circuit means connected with the DC terminals and operative to provide an effective short circuit across the DC terminals for any current having frequency about equal to twice the frequency of the AC voltage, thereby to cause the DC voltage to have an instantaneous absolute magnitude that is substantially equal to that of said AC voltage over at least half of the total duration of each half-cycle of this AC voltage; and inverter ballast means connected with the DC terminals and operative to convert the DC voltage provided therefrom such as to provide at a pair of ballast output terminals a magnitude-limited alternating current for powering a gas discharge lamp.

2. The ballast means of claim 1 wherein: (i) the L-C circuit means comprises a series-combination of an inductor and a capacitor, (ii) the series-combination is connected across the DC terminals, and (iii) the series-combination is series-resonant at or neat twice the frequency of the AC voltage.

3. An improvement in an electronic ballast for a gas discharge lamp; the ballast having: (i) rectifier means adapted to connect with the AC voltage on an ordinary electric utility power line and to provide a DC voltage across a pair of DC terminals, and (ii) inverter means connected with the DC terminals and operative to provide a magnitude-limited alternating current for powering a gas discharge lamp; the improvement comprising:

L-C circuit means connected with the DC terminals and operative to provide an effective short circuit thereacross for any current having frequency about equal to twice the frequency of the AC voltage, thereby to cause the instantaneous absolute magnitude of the DC voltage to be substantially equal to that of the AC voltage over at least half the duration of each half-cycle of this AC voltage.

4. The improvement of claim 3 wherein the frequency of the alternating current is substantially higher than twice the frequency of the AC voltage.

5. The improvement of claim 3 wherein the L-C circuit means comprises a series-combination of an inductor and a capacitor and wherein this series-combination is series-resonant at about twice the frequency of the AC voltage.

6. A ballast means adapted to be powered from the AC voltage on an ordinary electric utility power line and operative to power a gas discharge lamp, comprising:

rectifier means operative to connect with the power line and to provide a unidirectional current at a pair of DC output terminals;

inverter ballast means having a pair of DC input terminals and operative to provide at a set of ballast output terminals a magnitude-limited current for powering a gas discharge lamp; and filter means connected in circuit between the DC output terminals and the DC input terminals, thereby to provide at the DC input terminals a DC voltage having a magnitude characterized by being void of harmonic components of frequency equal to twice the fundamental frequency of the AC voltage and having an instantaneous absolute magnitude that is substantially equal to that of the AC voltage over at least half the duration of each half-period of the AC voltage.

7. The ballast means of claim 6 wherein the filter means comprises a series-combination of an inductor and a capacitor, with this series-combination being connected in circuit between the DC output terminals.

8. The ballast means of claim 7 wherein the series-combination is resonant at or near twice the fundamental frequency of the AC voltage.

9. An arrangement comprising:
rectifier means operative to connect with a source of AC voltage and to provide a unidirectional current at a pair of DC output terminals;
inverter ballast means having a pair of DC input terminals and operative to provide at a set of ballast output terminals a current for powering a gas discharge lamp; and
filter means connected in circuit with both the DC output terminals and the DC input terminals, thereby to provide at the DC input terminals a DC voltage having a magnitude characterized by: (i) having substantially no harmonic components of frequency equal to twice the fundamental frequency of the AC voltage, and (ii) having an instantaneous absolute magnitude that is substantially equal to that of the AC voltage over more than half of the duration of each half-cycle of the AC voltage.

10. The arrangement of claim 9 wherein the filter means comprises LC circuit means resonant at twice the fundamental frequency of the AC voltage.

11. An arrangement comprising:
a source of AC voltage; and
rectifier means connected with the source and operative to provide a DC voltage to a load such as an inverter ballast means; the DC voltage having a magnitude characterized by: (i) having substantially no harmonic components of frequency equal to twice the fundamental frequency of the AC voltage, and (ii) having an instantaneous absolute magnitude that is substantially equal to that of the AC voltage over more than half of the duration of each half-cycle of the AC voltage.

12. The arrangement of claim 11 wherein a filter means, including a series-combination of an inductor and a capacitor, is connected across the load; the series-combination being resonant at or near twice the fundamental frequency of the AC voltage.

* * * * *